(12) United States Patent  (10) Patent No.: US 9,189,404 B2
Helak et al.  (45) Date of Patent: Nov. 17, 2015

(54) PDSE DYNAMIC DIRECTORY OPTIMIZATION FOR CACHING

(71) Applicant: International Business Machines Corporation, Armonk, NY (US)

(72) Inventors: Dustin A. Helak, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 14/151,261

(22) Filed: Jan. 9, 2014

(65) Prior Publication Data

US 2015/0193345 A1  Jul. 9, 2015

(51) Int. Cl.
*G06F 17/30* (2006.01)
*G06F 12/08* (2006.01)
*G06F 12/10* (2006.01)

(52) U.S. Cl.
CPC ........ *G06F 12/0824* (2013.01); *G06F 12/0848* (2013.01); *G06F 12/0864* (2013.01); *G06F 12/1018* (2013.01); *G06F 17/30097* (2013.01); *G06F 17/30132* (2013.01); *G06F 2212/282* (2013.01); *G06F 2212/284* (2013.01); *G06F 2212/622* (2013.01)

(58) Field of Classification Search
CPC .............. G06F 17/30; G06F 17/30132; G06F 17/30097; G06F 12/0864
USPC .................................. 711/129; 707/636, 609
See application file for complete search history.

(56) References Cited

U.S. PATENT DOCUMENTS

| 6,330,556 B1 | 12/2001 | Chilimbi et al. |
| 8,145,724 B1 * | 3/2012 | Hawks et al. ................. 709/213 |
| 2013/0013561 A1 * | 1/2013 | Chan et al. .................... 707/636 |
| 2014/0164337 A1 * | 6/2014 | Reed et al. .................... 707/687 |

OTHER PUBLICATIONS

Yehuda Afek et al., CBTree: A Practical Concurrent Self-adjusting Search Tree, Proceedings of the 26th international conference on Distributed Computing, pp. 1-15 http://www.cs.tau.ac.il/~adamx/disc2012-cbtree.pdf.

* cited by examiner

*Primary Examiner* — Than Nguyen
(74) *Attorney, Agent, or Firm* — Terrile, Cannatti, Chambers & Holland, LLP; Stephen A. Terrile

(57) ABSTRACT

A method, system and computer-usable medium are disclosed for optimizing a Partitioned Data Set Extended (PDSE) directory. In various embodiments, b-tree directory structure entries associated with members of the PDSE are reordered to place members with the highest access counts within the same leaf nodes. This allows these members to share a directory path, which in turn increases the chance that the most frequently accessed member's directory path is in cache while minimizing storage footprint.

20 Claims, 6 Drawing Sheets

PDSE DYNAMIC DIRECTORY OPTIMIZATION FOR CACHING

BACKGROUND OF THE INVENTION

1. Field of the Invention

The present invention relates in general to the field of computers and similar technologies, and in particular to software utilized in this field. Still more particularly, it relates to a method, system and computer-usable medium for optimizing a Partitioned Data Set Extended (PDSE) directory.

2. Description of the Related Art

When a data set is allocated, a certain amount of space is reserved in units of blocks, tracks, cylinders, etc., on a storage disk or a storage device. A Partitioned Data Set Extended (PDSE) adds a layer of organization to the data set and includes a directory and one or more members. The directory uses a b-tree structure to reduce member search times. However, the b-tree directory structure does not take into account the realities of I/O operations and caching as implemented by a PDSE. As a result, all initial member opens have an equal chance of either having needed directory pages in cache or having to perform I/O operations to read the pages from a Direct Access Storage Device (DASD). In addition, the b-tree directory structure does not account for member usage, treating all members equally whether they have one access a month or one million.

SUMMARY OF THE INVENTION

A method, system and computer-usable medium are disclosed for optimizing a Partitioned Data Set Extended (PDSE) directory. In various embodiments, b-tree directory structure entries associated with members of the PDSE are reordered to place members with the highest access counts within the same leaf nodes. This allows these members to share a directory path, which in turn increases the chance that the most frequently accessed member's directory path is in cache while minimizing storage footprint.

In these embodiments, PDSE member access data is processed to rank members according to their respective access counts. Directory data is then processed to determine the names of the two members with the highest access counts and their placement within the PDSE directory structure. Renaming operations are then performed to rename the original name of the member with the second highest access count to a second name. Directory insertion operations are then performed to place the renamed member within the directory such that it is adjacent to the member with the highest access count. An entry is then added to a translation hash table (THT) associated with the directory to provide a translation between the original and second names of the member with the second highest access count.

In various embodiments, the processing of the PDSE member access data includes generating a mean number of accesses for the members of the PDSE. The mean number is then processed with each member's respective access count to generate a corresponding standard deviation value for each member's access count. Each member's access count and their associated standard deviation value are then processed to identify a set of PDSE members that exceed a predetermined threshold of standard deviations above the mean number of accesses. The identified PDSE members are then designated as being eligible for optimization. In certain embodiments, pair-wise difference operations are performed on the access counts associated with the eligible PDSE members to generate a set of delta access values and a set of change-in-rate values. These values are in turn processed to determine the initial inflection point for the first local increase in access counts associated with the eligible members.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
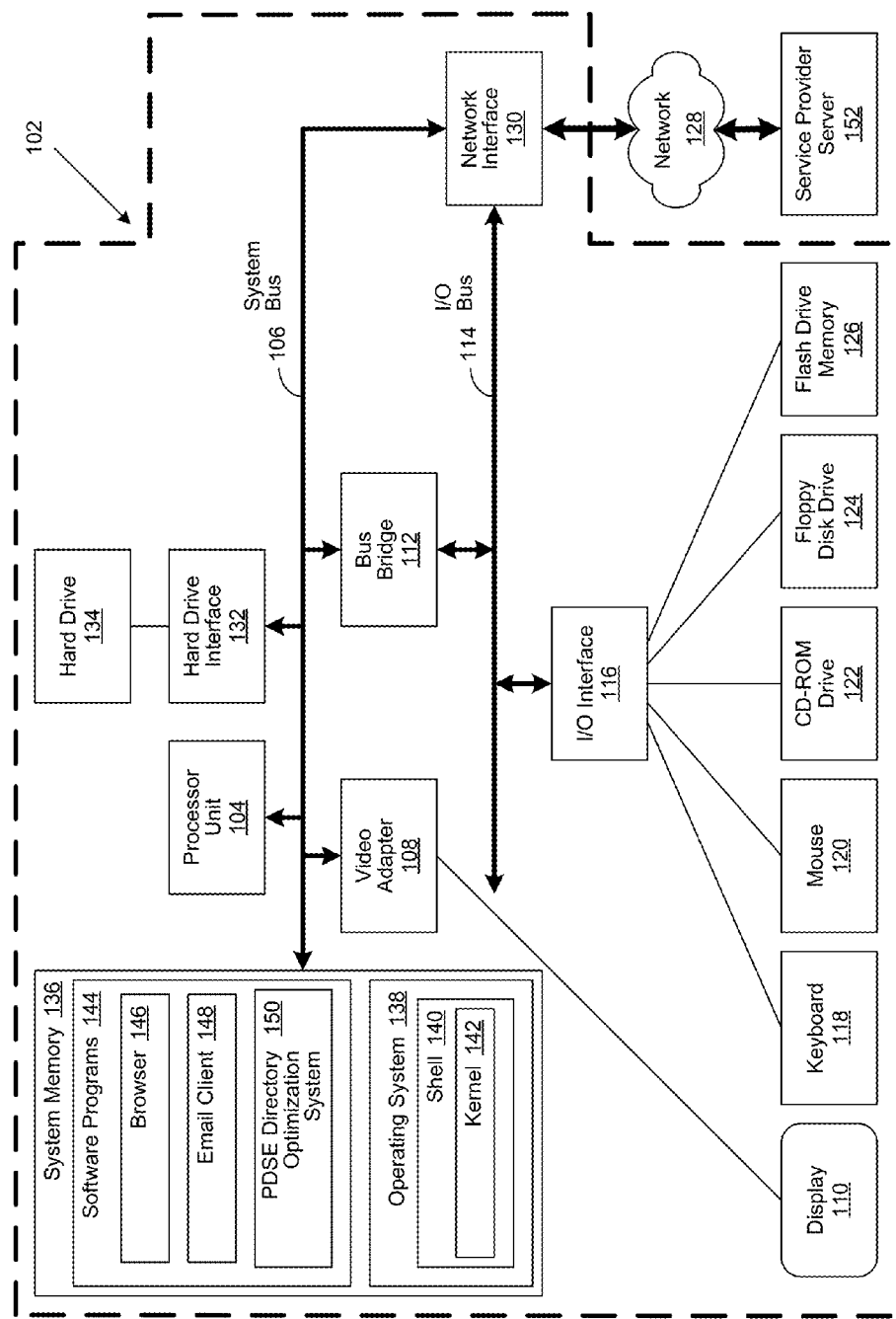
FIG. 1 depicts an exemplary client computer in which the present invention may be implemented.

A method, system and computer-usable medium are disclosed for optimizing a Partitioned Data Set Extended (PDSE) directory. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a Partitioned Data Set Extended (PDSE) Directory Optimization System 150. In these and other embodiments, the PDSE Directory Optimization System 150 includes code for implementing the processes described hereinbelow. In one embodiment, client computer 102 is able to download the PDSE Directory Optimization System 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
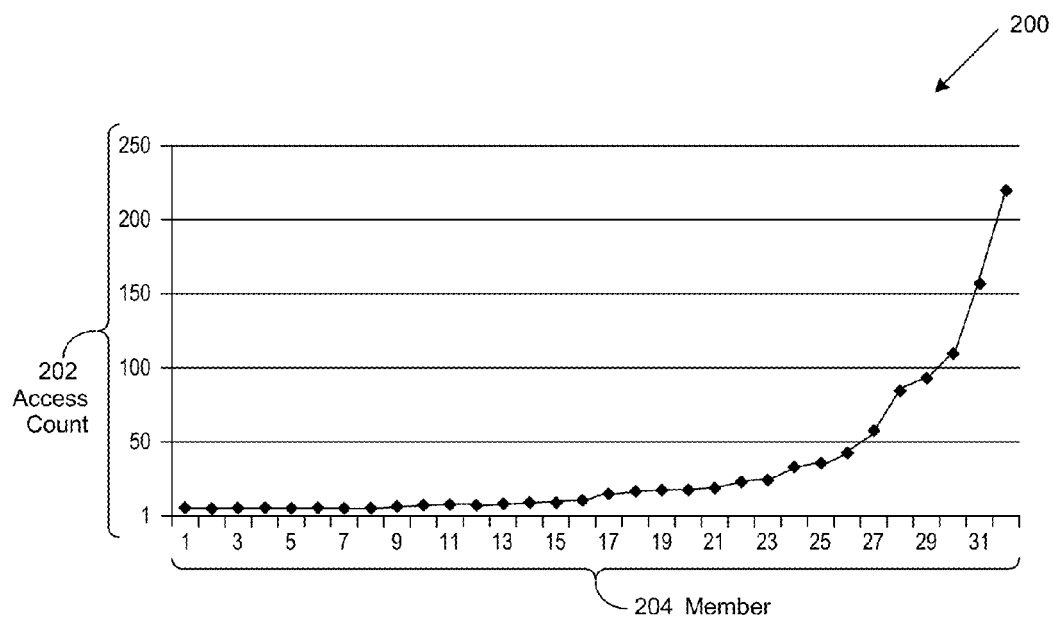
FIG. 2 is a simplified graph of eligible Partitioned Data Set Extended (PDSE) member access counts used for optimizing a PDSE directory

FIG. 2 is a simplified graph of eligible Partitioned Data Set Extended (PDSE) member access counts as implemented in accordance with an embodiment of the invention for optimizing a PDSE directory. As used herein, a PDSE refers to a dataset, typically implemented in a mainframe computing environment that includes a directory and zero or more members, each of which holds a separate sub-data set consisting of sequentially stored records. The directory holds the address of each member and thus makes it possible to access each member directly. As such, a PDSE is often used to hold executable programs and source program libraries, such as assembler macro definitions.

A distinguishing feature of a PDSE directory is its ability to expand automatically as needed, up to an addressing limit of 522,236 members. The PDSE directory also has an index, which provides a fast search for member names. One advantage of the PDSE directory is that space from deleted or moved members is automatically reused for new members. As a result, the PDSE does not have to be compressed to remove wasted space.

In various embodiments, the first step in optimizing the PDSE directory is to determine which members will benefit the most from the optimization. In these embodiments, this is determined via access counts for each member in the PDSE directory. In certain embodiments, member optimization selection is determined in a two-step process. The first step, which is typically performed less frequently, determines the mean number of member accesses for each member of the PDSE directory. The second step is then performed to determine the standard deviation of each member's respective access counts. The resulting access counts and standard deviation values are then processed to identify members that exceed a predetermined threshold of standard deviations above the mean and are therefore designated as being eligible for optimization.

From the foregoing, those of skill in the art will recognize that the primary goal of the first member optimization step is to reduce the search space for the calculations performed in the second member optimization step. In various embodiments, the calculations performed in the second member optimization step occur more frequently and thereby dynamically determines the access threshold above which members are designated as being eligible for optimization. In these embodiments, the goal is to determine from a list of eligible member 204 access counts 202, which are graphically depicted in FIG. 2, the initial inflection point for the first local increase in member access counts 202 that is of significance.

Figure 3:
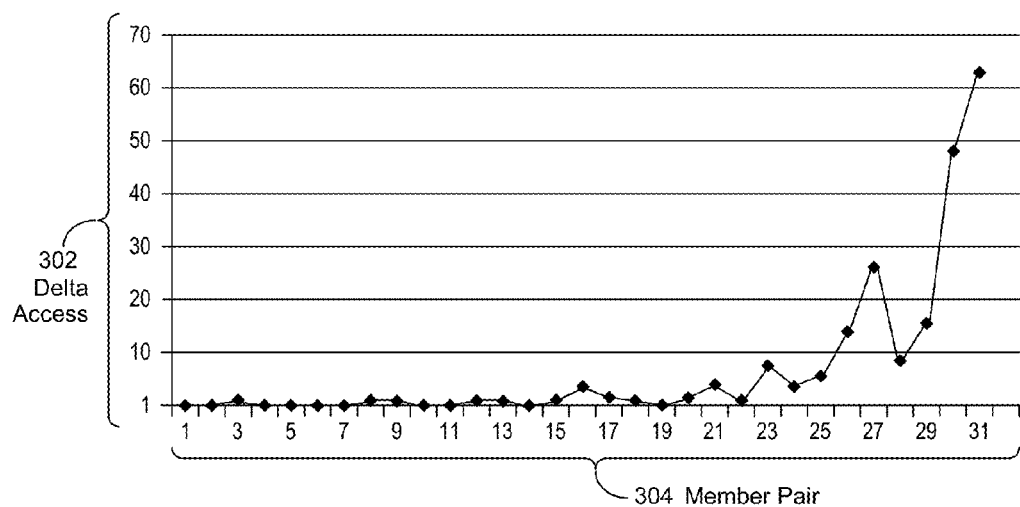
FIG. 3 is a simplified graph showing the results of a first pass of pair-wise difference operations.
Figure 4:
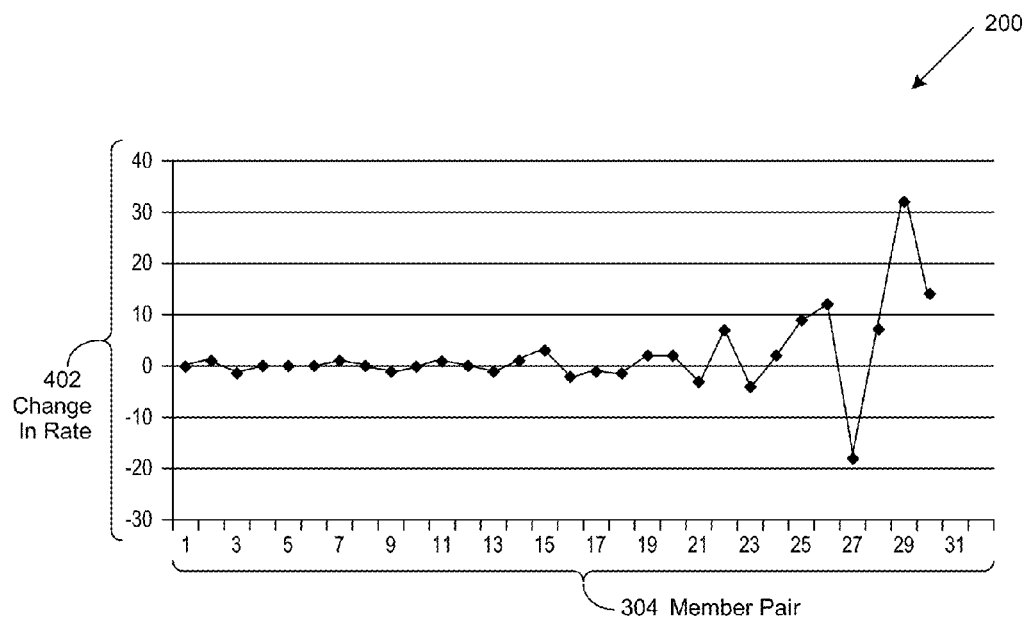
FIG. 4 is a simplified graph showing the results of a second pass of pair-wise difference operations.
Figure 5:
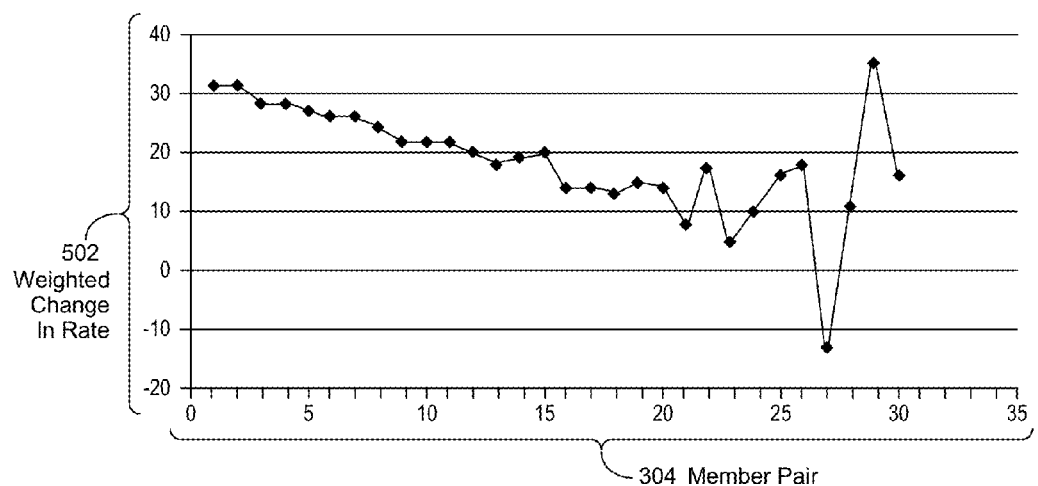
FIG. 5 is a simplified graph showing the threshold member access count associated with the first increase in a weighted value.

FIG. 3 is a simplified graph showing the results of a first pass of pair-wise difference operations implemented in accordance with an embodiment of the invention. FIG. 4 is a simplified graph showing the results of a second pass of pair-wise difference operations implemented in accordance with an embodiment of the invention. FIG. 5 is a simplified graph showing the threshold member access count associated with the first increase in a weighted value implemented in accordance with an embodiment of the invention. As shown in FIGS. 3, 4, and 5, the initial inflection point for the first local increase in member access counts is determined in various embodiments by performing the two passes of pair-wise difference operations on member pairs 304 to generate a set of delta access values 302 and a set of change-in-rate values 402. In combination, the set of delta access values 302 and the set of change-in-rate values 402 are used to approximate the second derivative of the graph of the access counts. As shown in FIG. 5, the results of the pair-wise difference passes are then weighted against the maximum rate of change of deltas 502, which makes the first increase in weighted value the threshold member access count.

Figure 6A:
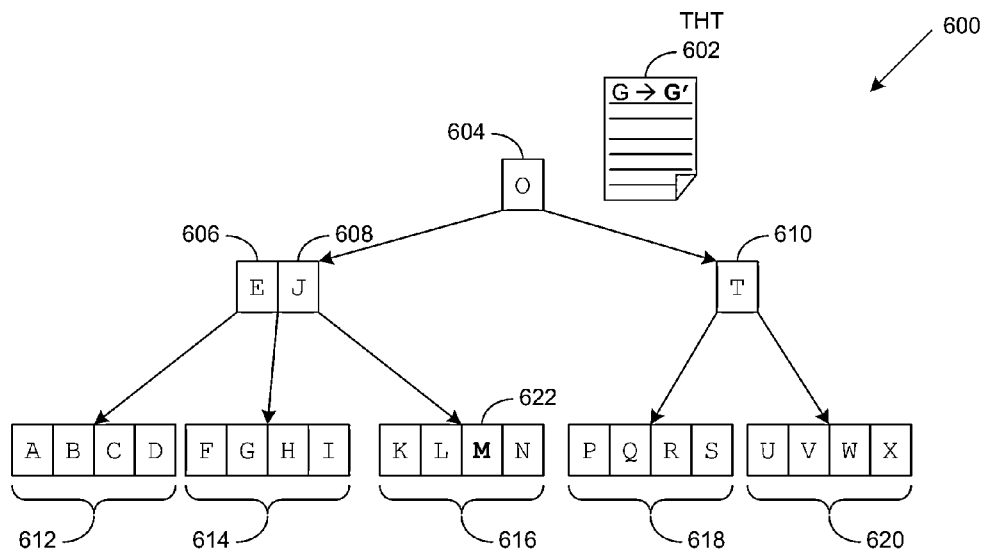
FIGS. 6a through 6e are a simplified block diagram showing the reordering of predetermined PDSE members for optimizing a PDSE directory.

FIGS. 6a through 6e are a simplified block diagram showing the reordering of predetermined Partitioned Data Set Extended (PDSE) members in accordance with an embodiment of the invention for optimizing a PDSE directory. In this embodiment, a PDSE includes a b-tree directory structure 600 and a Translation Hash Table (THT) 602. As shown in FIG. 6a, the b-tree directory structure 600 includes a root node 604 containing member name 'O', which in turn is associated with branch nodes 606, 608 and 610, respectively containing member names 'E', 'J' and 'I'. As likewise shown in FIG. 6a, branch node 606 is associated with leaf node 612, which contains member names 'A' through 'E', and branch node 608 is associated with leaf node 616, which contains member names 'K' through 'N'. Likewise, branch nodes 606 and 608 are associated with one another and jointly are associated with leaf node 614, which contains member names 'F' through 'I' 614. Likewise, branch node 610 is associated with leaf nodes 618 and 620, which respectively contain member names P' through 'S' and 'U' through 'X'. In this embodiment, the leaf nodes 612, 614, 616, 618 and 620, which respectively contain member names 'A' through 'E', 'F' through 'I', 'K' through 'N', 'P' through 'S', and 'U' through 'X' provide an eligibility pool of members, which can be used for optimization of the b-tree directory structure 600.

In various embodiments, the eligibility threshold dynamically adjusts to expand or contract the eligibility pool of members to make the best use of the available THT 602 space. In certain embodiments, the adjustment is made based upon the load factor of the THT 602. In various embodiments, members selected from the eligibility pool may also be pared, based upon the load factor of the THT 602 and the maximum THT 602 size selected by a user.

In certain embodiments a new structure is added to the b-tree directory structure 600 and the THT 602 to accommodate optimization and maintain searchability. In these embodiments, the THT 602 is initially sized at 1 page, but may grow up to a predetermined, tunable threshold value while maintaining a predetermined per-page load value (e.g., less than 75%). These two values determine the total number of members available for optimization of the b-tree directory structure 600. In various embodiments, a predetermined value is set for the maximum capacity per page (e.g., 200 members). In these embodiments, the method of determining the maximum capacity value is a matter of design choice. In certain embodiments, the THT 602 allows for linear time lookup of the optimized name of a given member, which is used by all connections to that optimized member.

Figure 6B:
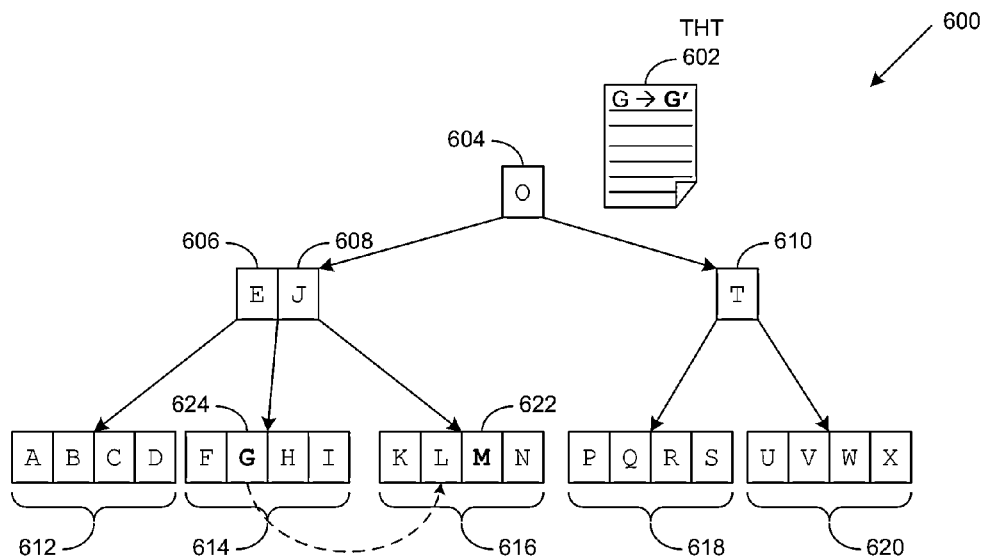
Figure 6C:
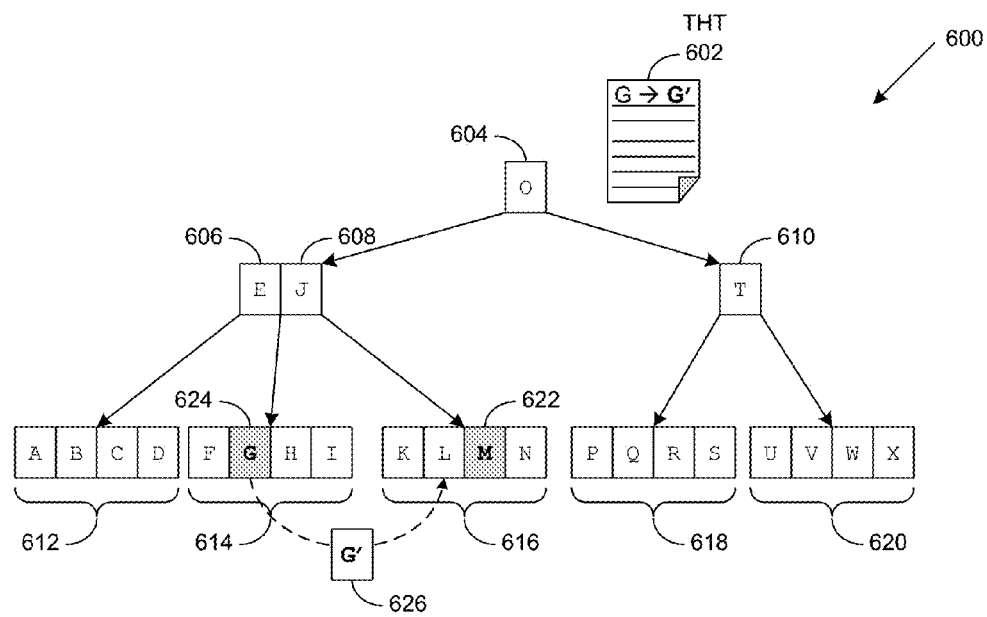

Referring now to FIG. 6a, the optimization process begins by first determining the name of the member with the highest access count in the PDSE, which is the member named 'M' 622, and then determining the leaf node that the member named "M" resides in, which is leaf node 616. Because it is by definition already optimized, the member with the highest access count (i.e., the member named 'M' 622) is not included in the THT 602. As shown in FIG. 6b, the next most accessed member, which is the member named 'G' 624, becomes the first member to be optimized and will be placed closest to the member named 'M' 622 in the b-tree directory structure 600. The leaf node 616 containing the member named 'M' 622 is then examined and the member names of the adjacent members in that node are used to interpolate a new member name, which as shown in FIG. 6c is referred to as a member named 'G'' 626, which will be placed adjacent to the member named 'M' 622 in leaf node 616. An entry is then added to the THT 602 for the member named 'G' 624, translating to the member named 'G'' 626.

Figure 6D:
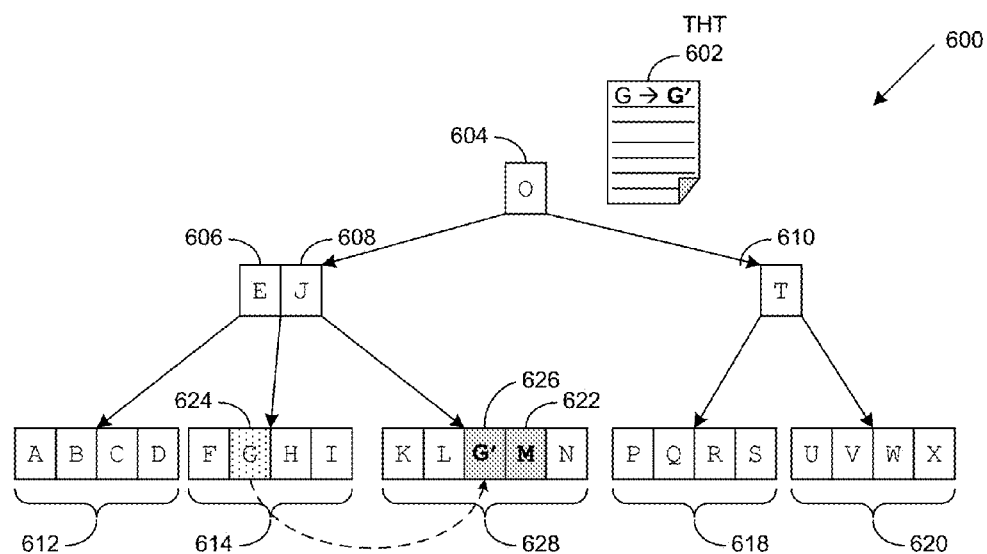
Figure 6E:
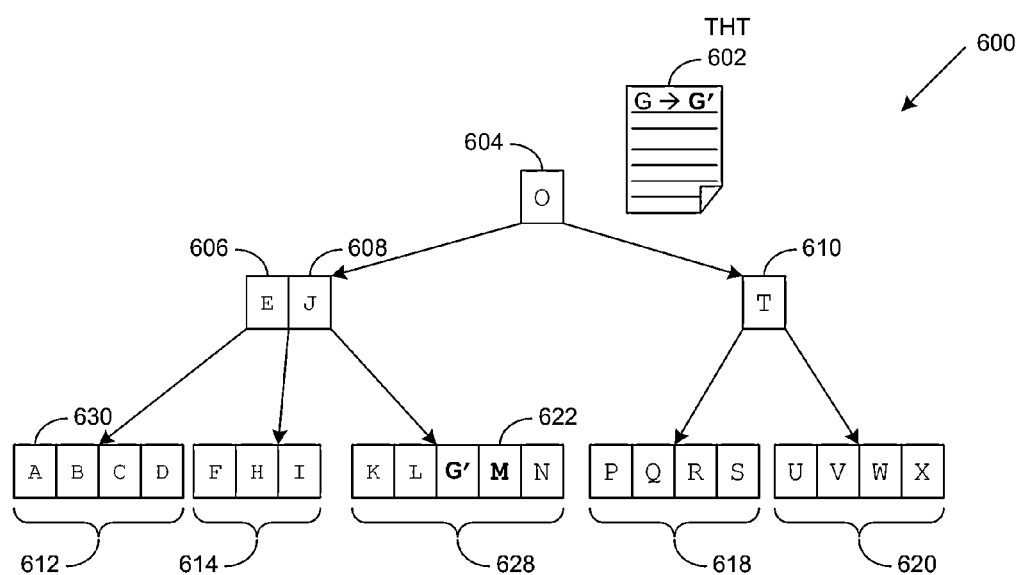

Next, as shown in FIG. 6d, the member named 'G'' 626, which duplicates the member named 'G' 624, is added to the b-tree directory structure 600 by using b-tree directory structure insert operations familiar to those of skill in the art. The member named 'G' 624 is then marked for deletion from the b-tree directory structure 600. As shown in FIG. 6e, leaf node 614 now contains the members named 'F', 'H' and 'I', and the members that are respectively named 'G'' 626 and 'M' 622 are now adjacent to one another in leaf node 628. As a result, the members named 'G'' 626 and 'M' 622 now have the same search path through the b-tree directory structure 600, which increases the likelihood for either member that the necessary directory pages are in cache for any given open, thus saving I/O time. In various embodiments, the optimization process then continues for all members selected for optimization. Any tree balancing that is necessary proceeds according to insertion balancing rules familiar to skilled practitioners of the art.

As more members become optimized, they may be balanced into nodes adjacent to the node associated with the member named 'A' 630. As a result, the most heavily accessed members will remain closest to the member named 'A' 630, so the degree of optimization for a given member is related to its access count. In certain embodiments, the optimization process is performed in reverse when a member is de-selected for optimization. For example, the information for the member named 'G' 626 is first duplicated back to the member named 'G' 624. Then the entry in the THT 602 is deleted, the member named 'G' 624 is inserted back into the b-tree directory structure 602, and the member named 'G' 626 is deleted. Any associated tree balancing operations are performed deletion balancing rules familiar to those of skill in the art.

In various embodiments, the member name is checked against the THT 602 upon access of the member to determine whether the member has been optimized. If so, the optimized name is substituted when accessing the b-tree directory structure 600. If not, the member name is not modified and access proceeds as normal.

From the foregoing, it will be appreciated that the dynamic restructuring of the b-tree directory structure 600 advantageously uses available directory caching facilities. Furthermore, reorganizing various b-tree directory structure 600 entries in order to place members with the highest access counts within the same leaf nodes allows them to share a directory path, which in turn increases the chance that the most frequently accessed member's directory path is in cache while minimizing storage footprint. In addition, the reorganization of members in the b-tree directory structure 600 will not affect the search efficiency of the b-tree.

Although the present invention has been described in detail, it should be understood that various changes, substitutions and alterations can be made hereto without departing from the spirit and scope of the invention as defined by the appended claims.

What is claimed is:

1. A computer-implemented method for optimizing a Partitioned Data Set Extended (PDSE) directory, comprising:
   processing PDSE member access data to select a first member and a second member from a first set of PDSE members, the first and second member respectively having the highest and second highest access count;
   processing directory data to determine the names of the first and second member and their respective placement within a directory associated with the PDSE;
   performing renaming operations to rename the original name of the second member to a second name;
   performing directory insertion operations to place the renamed second member adjacent to the first member within the directory; and
   adding an entry to a translation hash table (THT) associated with the directory, the entry providing a translation between the original and second names of the second member.

2. The method of claim 1, wherein the processing of the PDSE member access data comprises:
   processing the access count for each member of the first set of PDSE members to generate a first set of access counts; and
   processing the first set of access counts to generate a mean number of accesses.

3. The method of claim 2, further comprising:
   processing the mean number of accesses with each member's respective access count to generate a corresponding standard deviation value for each member's access count.

4. The method of claim 3, further comprising:
   processing the first set of access counts and the standard deviation value for each member's respective access count to generate a second set of access counts corresponding to a second set of PDSE members that exceed a predetermined threshold of standard deviations above the mean number of accesses; and
   designating the second set of PDSE members as being eligible for optimization.

5. The method of claim 4, further comprising:
   using the second set of access counts to perform:
      a first set of pair-wise difference operations to generate a set of delta access values; and
      a second set of pair-wise difference operations to generate a set of change-in-rate values.

6. The method of claim 5, further comprising:
   processing the set of delta access values and the set of change-in-rate values to determine the initial inflection point for the first local increase in the second set of member access counts.

7. A system comprising:
   a processor;
   a data bus coupled to the processor; and
   a computer-usable medium embodying computer program code, the computer-usable medium being coupled to the data bus, the computer program code used for optimizing a Partitioned Data Set Extended (PDSE) directory and comprising instructions executable by the processor and configured for:
      processing PDSE member access data to select a first member and a second member from a first set of PDSE members, the first and second member respectively having the highest and second highest access count;
      processing directory data to determine the names of the first and second member and their respective placement within a directory associated with the PDSE;
      performing renaming operations to rename the original name of the second member to a second name;
      performing directory insertion operations to place the renamed second member adjacent to the first member within the directory; and
      adding an entry to a translation hash table (THT) associated with the directory, the entry providing a translation between the original and second names of the second member.

8. The system of claim 7, wherein the processing of the PDSE member access data comprises:
   processing the access count for each member of the first set of PDSE members to generate a first set of access counts; and
   processing the first set of access counts to generate a mean number of accesses.

9. The system of claim 8, further comprising:
   processing the mean number of accesses with each member's respective access count to generate a corresponding standard deviation value for each member's access count.

10. The system of claim 9, further comprising:
   processing the first set of access counts and the standard deviation value for each member's respective access count to generate a second set of access counts corresponding to a second set of PDSE members that exceed a predetermined threshold of standard deviations above the mean number of accesses; and
   designating the second set of PDSE members as being eligible for optimization.

11. The system of claim 10, further comprising:
   using the second set of access counts to perform:

a first set of pair-wise difference operations to generate a set of delta access values; and a second set of pair-wise difference operations to generate a set of change-in-rate values.

12. The system of claim 11, further comprising:

processing the set of delta access values and the set of change-in-rate values to determine the initial inflection point for the first local increase in the second set of member access counts.

13. A non-transitory, computer-readable storage medium embodying computer program code, the computer program code comprising computer executable instructions configured for:

processing PDSE member access data to select a first member and a second member from a first set of PDSE members, the first and second member respectively having the highest and second highest access count;

processing directory data to determine the names of the first and second member and their respective placement within a directory associated with the PDSE;

performing renaming operations to rename the original name of the second member to a second name;

performing directory insertion operations to place the renamed second member adjacent to the first member within the directory; and adding an entry to a translation hash table (THT) associated with the directory, the entry providing a translation between the original and second names of the second member.

14. The non-transitory, computer-readable storage medium of claim 13, further comprising:

processing the access count for each member of the first set of PDSE members to generate a first set of access counts; and processing the first set of access counts to generate a mean number of accesses.

15. The non-transitory, computer-readable storage medium of claim 14, further comprising:

processing the mean number of accesses with each member's respective access count to generate a corresponding standard deviation value for each member's access count.

16. The non-transitory, computer-readable storage medium of claim 15, further comprising:

processing the first set of access counts and the standard deviation value for each member's respective access count to generate a second set of access counts corresponding to a second set of PDSE members that exceed a predetermined threshold of standard deviations above the mean number of accesses; and designating the second set of PDSE members as being eligible for optimization.

17. The non-transitory, computer-readable storage medium of claim 16, further comprising:

using the second set of access counts to perform:

a first set of pair-wise difference operations to generate a set of delta access values; and a second set of pair-wise difference operations to generate a set of change-in-rate values.

18. The non-transitory, computer-readable storage medium of claim 17, further comprising:

processing the set of delta access values and the set of change-in-rate values to determine the initial inflection point for the first local increase in the second set of member access counts.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *